(12) United States Patent  
Liebhold

(10) Patent No.: US 7,982,809 B2
(45) Date of Patent: Jul. 19, 2011

(54) METHOD AND APPARATUS FOR PROVIDING A PICTURE CROPPING FUNCTION

(75) Inventor: Valerie Sacrez Liebhold, Framingham, MA (US)

(73) Assignee: Thomson Licensing, Boulogne Billancourt (FR)

( * ) Notice: Subject to any disclaimer, the term of this patent is extended or adjusted under 35 U.S.C. 154(b) by 1134 days.

(21) Appl. No.: 11/663,184

(22) PCT Filed: Oct. 6, 2004

(86) PCT No.: PCT/US2004/032930
§ 371 (c)(1),
(2), (4) Date: Mar. 19, 2007

(87) PCT Pub. No.: WO2006/041478
PCT Pub. Date: Apr. 20, 2006

(65) Prior Publication Data
US 2008/0094502 A1 Apr. 24, 2008

(51) Int. Cl.
*H04N 5/44* (2006.01)
(52) U.S. Cl. .................. 348/734; 348/445; 348/581
(58) Field of Classification Search .......... 348/524–625, 348/630, 903–904, 445, 734, 913, 704; 345/628–629, 788, 790–791, 794, 798, 800; *H04N 5/44, 7/01, 9/74*
See application file for complete search history.

(56) References Cited

U.S. PATENT DOCUMENTS

| 5,031,044 | A | | 7/1991 | Canfield et al. |
| 5,315,391 | A | | 5/1994 | Lee |
| 5,363,143 | A | | 11/1994 | Duffield |
| 5,398,074 | A | | 3/1995 | Duffield et al. |
| 5,430,494 | A | | 7/1995 | Saeger et al. |
| 5,434,625 | A | | 7/1995 | Willis |
| 5,473,740 | A | * | 12/1995 | Kasson .................. 345/628 |
| 5,699,123 | A | * | 12/1997 | Ebihara et al. ........... 348/445 |
| 5,777,626 | A | | 7/1998 | Takashima |
| 6,313,923 | B1 | | 11/2001 | Takanashi et al. |
| 6,678,009 | B2 | * | 1/2004 | Kahn ..................... 348/569 |
| 6,791,624 | B1 | | 9/2004 | Suga |
| 2002/0051249 | A1 | | 5/2002 | Lu |
| 2002/0191861 | A1 | | 12/2002 | Cheatle |
| 2003/0189669 | A1 | * | 10/2003 | Bowser .................. 348/564 |

FOREIGN PATENT DOCUMENTS

GB 2380631 2/2002
(Continued)

OTHER PUBLICATIONS

Search Report dated May 16, 2005.

*Primary Examiner* — Trang U Tran
(74) *Attorney, Agent, or Firm* — Robert D. Shedd; Joseph J. Opalach; Reitseng Lin

(57) ABSTRACT

A method and apparatus for providing a picture cropping function enables users to crop pictures in a convenient and direct manner using discrete navigation keys of a user input device. According to an exemplary embodiment, an apparatus includes a first processor operative to provide at least one of an audio and video output during a first mode. A second processor is operative to provide a picture cropping function during a second mode by enabling a user to crop a picture using discrete navigation keys of a user input device of the apparatus.

18 Claims, 9 Drawing Sheets

FOREIGN PATENT DOCUMENTS

| | | |
|---|---|---|
| JP | 6-334975 | 12/1994 |
| JP | 7-302322 | 11/1995 |
| JP | 2001-51203 | 2/2001 |
| JP | 2001-119644 | 4/2001 |
| JP | 2002-281269 | 9/2002 |
| KR | 2006-43337 | 5/2006 |
| WO | WO0180186 | 10/2001 |
| WO | WO2004/015628 | 2/2004 |

* cited by examiner under 35 U.S.C. §365

METHOD AND APPARATUS FOR PROVIDING A PICTURE CROPPING FUNCTION

This application claims the benefit, under 35 U.S.C. §365 of International Application PCT/US04/32930, filed Oct. 6, 2004, which was published in accordance with PCT Article 21(2) on Apr. 20, 2006 in English.

BACKGROUND OF THE INVENTION

1. Field of the Invention

The present invention generally relates to picture cropping, and more particularly, to a method and apparatus for providing a picture cropping function that, among other things, enables users to crop pictures in a convenient and direct manner using navigation keys of a user input device.

2. Background Information

Picture cropping is a useful function for removing an undesired part of a picture. For example, a user may want to crop a picture in order to remove a particular object or individual from the picture. At present, picture cropping tends to be an inconvenient and time-consuming process for users. In particular, in order to crop a picture a user may first obtain a picture file (e.g., in JPEG or other format) containing a picture to be cropped from a picture acquiring device such as a digital camera. The user may then input the picture file containing the picture to be cropped into a computer equipped with specialized imaging software, and crop the picture to produce a cropped picture. Thereafter, if the user desires to view the cropped picture using another apparatus or device (e.g., DVD player), the user must then separately input the cropped picture into the other apparatus or device. This process tends to be inconvenient and time-consuming for the user since he or she must perform the picture input process two separate times (i.e., once to the computer to crop the picture, and once to the other apparatus or device for viewing).

Another problem with existing picture cropping techniques is that the imaging software utilized by the computer requires the user to utilize a mouse device of the computer to select specific edges of a picture that can be moved one at a time to thereby crop the picture. Since the mouse device is a continuous navigation device, it is often difficult for users to precisely adjust the edges of the picture in a desired manner. As a result, users may not obtain the cropped picture they optimally desire.

Accordingly, there is a need for a method and apparatus for providing a picture cropping function that addresses the foregoing problems, and thereby enables, among other things, users to crop pictures in a convenient and direct manner using navigation keys of a user input device. The present invention addresses these and/or other issues.

SUMMARY OF THE INVENTION

In accordance with an aspect of the present invention, a method for operating an apparatus is disclosed. According to an exemplary embodiment, the method comprises steps of providing at least one of an audio and video output during a first mode, and providing a picture cropping function during a second mode by enabling a user to crop a picture using navigation keys of a user input device of the apparatus.

In accordance with another aspect of the present invention, an apparatus is disclosed. According to an exemplary embodiment, the apparatus comprises first processing means for providing at least one of an audio and video output during a first mode. Second processing means provide a picture cropping function during a second mode by enabling a user to crop a picture using navigation keys of a user input device of the apparatus.

In accordance with yet another aspect of the present invention, a television signal receiver is disclosed. According to an exemplary embodiment, the television signal receiver comprises a first processor operative to provide at least one of an audio and video output during a first mode. A second processor is operative to provide a picture cropping function during a second mode by enabling a user to crop a picture using navigation keys of a user input device of the television signal receiver.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Figure 1:
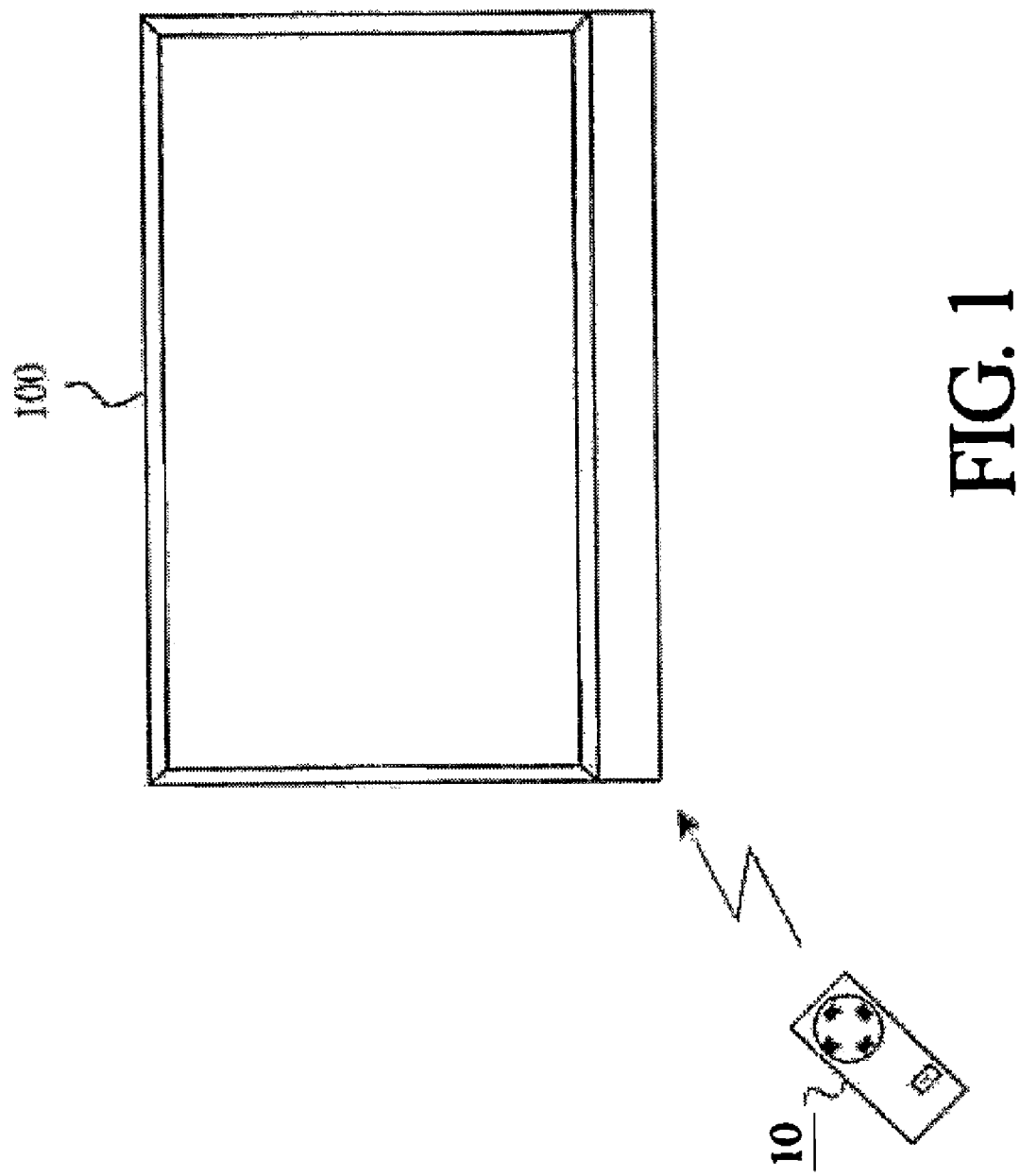
FIG. 1 is a diagram of an exemplary environment suitable for implementing the present invention.

Referring now to the drawings, and more particularly to FIG. 1, an exemplary environment suitable for implementing the present invention is shown. The exemplary environment of FIG. 1 comprises user input means such as user input device 10, and an audio/video (A/V) apparatus 100. According to an exemplary embodiment, A/V apparatus 100 is embodied as a consumer electronics device such as a television signal receiver or a DVD recorder, but may be embodied as another type of device or apparatus, regardless of whether it includes an integrated display device.

User input device 10 is operative to generate and output control signals that control the operation of A/V apparatus 100 and/or other devices. According to an exemplary embodiment, user input device 10 includes a plurality of input keys including discrete navigation keys, and outputs control signals in a wired and/or wireless (e.g., via infrared or radio frequency (RF) link, etc.) manner responsive to user depression of its input keys. User input device 10 may for example be embodied as a hand-held remote control device, wired and/or wireless keyboard, integrated control panel of A/V apparatus 100, and/or other user input device having discrete navigation keys. Further details regarding user input device 10 will be provided later herein.

A/V apparatus 100 is operative to perform various functions including an audio and/or video output function, and a picture cropping function. According to an exemplary embodiment, A/V apparatus 100 includes at least two different operating modes, referred to herein as a first mode and a second mode. During the first mode, A/V apparatus 100 is operative to receive signals including audio and/or video signals in analog and/or digital format from one or more signal sources such as terrestrial, cable, satellite, internet and/or other signal sources and to provide audio and/or video outputs corresponding to these received signals. A/V apparatus 100 is also operative to process received signals and provide the resulting processed signals to one or more other devices, and to receive signals from other devices during the first mode.

During the second mode, A/V apparatus 100 is operative to perform a picture cropping function. According to an exemplary embodiment, A/V apparatus 100 performs the picture cropping function responsive to user inputs via user input device 10. In particular, the present invention enables users to crop pictures using discrete navigation keys of user input device 10. The use of discrete navigation keys to perform the picture cropping function is particularly advantageous since it allows users to precisely adjust the edges of a picture in a desired manner. Further details regarding A/V apparatus 100 will be provided later herein.

Figure 2:
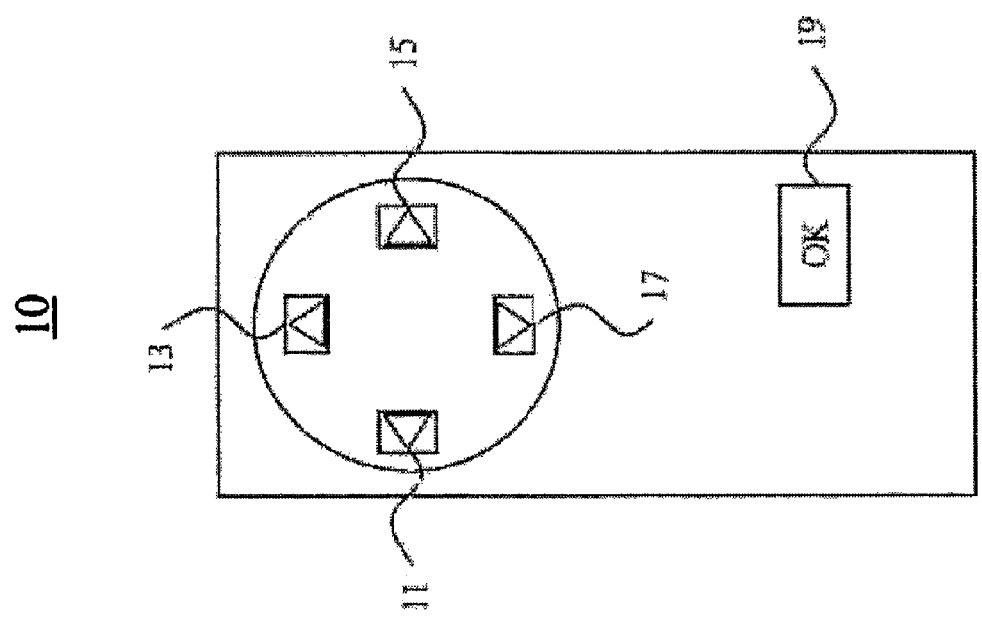
FIG. 2 is a diagram illustrating further exemplary details of the user input device of FIG. 1.

Referring to FIG. 2, a diagram providing further exemplary details of user input device 10 of FIG. 1 is shown. As indicated in FIG. 2, user input device 10 comprises discrete navigation keys including a left arrow key 11, an up arrow key 13, a right arrow key 15, and a down arrow key 17 which enable a user to independently adjust each edge of a picture to thereby create a cropped picture having a different aspect ratio than the original picture. User input device 10 also includes a predetermined key 19 which enables the user to switch edge adjustment capability among the different edges of the picture, and also to confirm selection of desired positions for each edge of the cropped picture. For purposes of example and explanation, predetermined key 19 is shown in FIG. 2 as an "OK" key. However, predetermined key 19 could have other labels such as "Enter", "Select" or the like. User input device 10 may also have other keys in addition to those expressly shown in FIG. 2 that enable users to control various functions of A/V apparatus 100. Further details regarding how the aforementioned keys of user input device 10 may be used to generate a cropped picture will be provided later herein.

Figure 3:
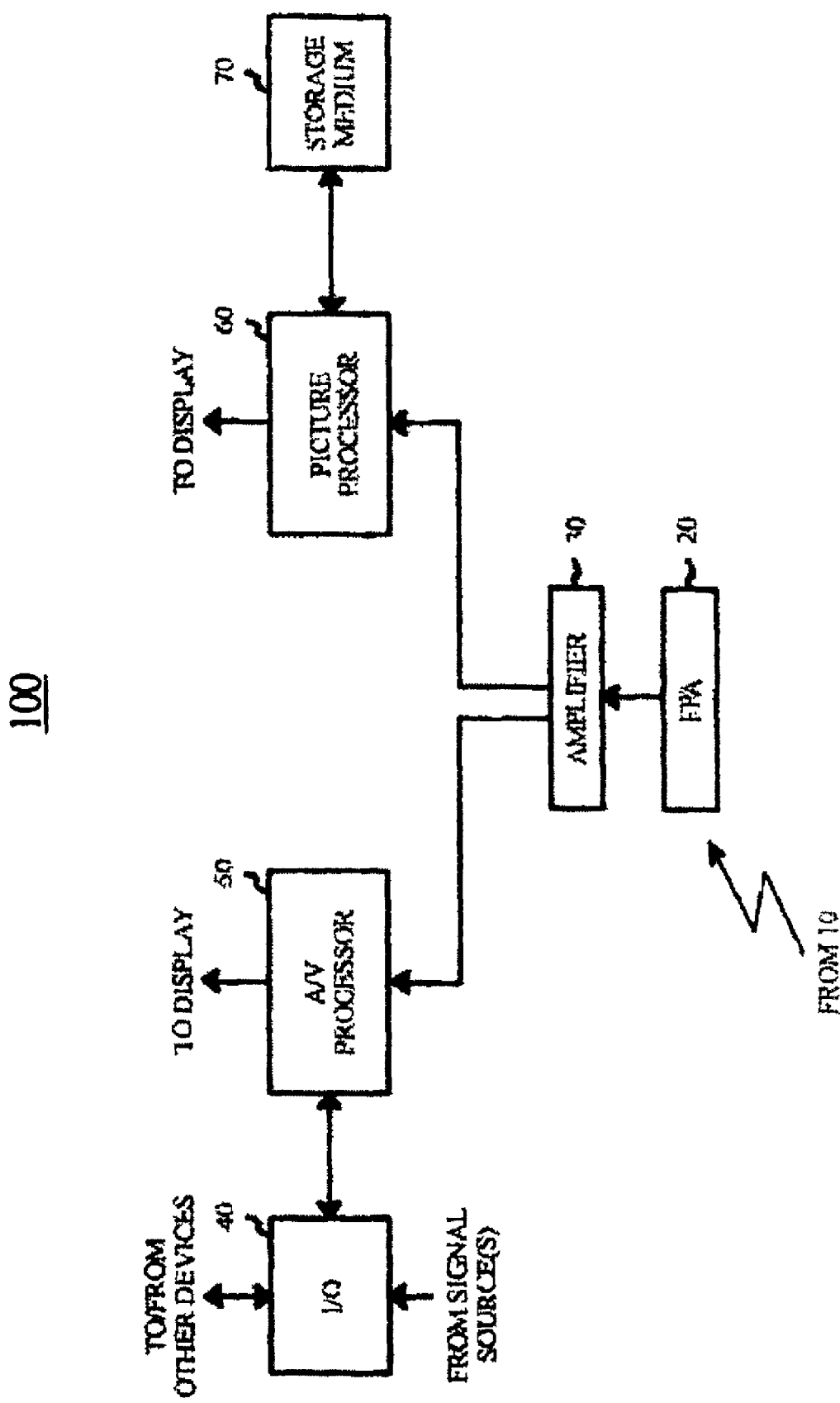
FIG. 3 is a block diagram illustrating further exemplary details of the apparatus of FIG. 1.

Referring to FIG. 3, a block diagram providing further exemplary details of A/V apparatus 100 of FIG. 1 is shown. A/V apparatus 100 of FIG. 3 comprises front panel means such as front panel assembly (FPA) 20, amplifying means such as amplifier 30, and input/output (I/O) means such as I/O block 40, first processing means such as A/V processor 50, second processing means such as picture processor 60, and data storage means such as storage medium 70. Some of the foregoing elements of FIG. 3 may be embodied using integrated circuits (ICs), and some elements may for example be included on one or more ICs. For clarity of description, certain conventional elements associated with A/V apparatus 100 such as certain control signals, power signals and/or other elements may not be shown in FIG. 3.

FPA 20 is operative to receive user inputs from user input device 10, and to output signals corresponding to the user inputs to amplifier 30. According to an exemplary embodiment, FPA 20 receives signals, such as IR and/or RF signals, from user input device 10 and generates corresponding signals which are output to amplifier 30. Amplifier 30 is operative to amplify signals provided from FPA 20 for output to A/V processor 50 and picture processor 60.

I/O block 40 is operative to perform I/O functions of A/V apparatus 100. According to an exemplary embodiment, I/O block 40 is operative to receive signals including audio and/or video signals in analog and/or digital format from one or more signal sources such as terrestrial, cable, satellite, internet and/or other signal sources. I/O block 40 is also operative to output processed signals to one or more other devices, and to receive signals from such devices.

A/V processor 50 is operative to perform various A/V signal processing and control functions of A/V apparatus 100. According to an exemplary embodiment, A/V processor 50 processes the audio and/or video signals provided from I/O block 40 during the first mode of A/V apparatus 100 by performing functions including tuning, demodulation, forward error correction, transport processing functions, and decoding functions to thereby generate digital data representing audio and/or video content. The digital data produced from such processing functions during the first mode may be provided for further processing and output.

Picture processor 60 is operative to perform various picture processing functions including a picture cropping function. According to an exemplary embodiment, picture processor 60 performs picture processing functions that enable a user to crop a picture during the second mode of A/V apparatus 100 using left arrow key 11, up arrow key 13, right arrow key 15, down arrow key 17 and predetermined key 19 of user input device 10. Using the aforementioned discrete navigation keys 11, 13, 15, 17, and predetermined key 19, picture processor 60 enables a user to adjust each edge of a picture independently to generate a cropped picture having a different aspect ratio than the original picture. Picture processor 60 may share certain components with A/V processor 50, and may be implemented on the same IC, or different ICs. A single processor may be used to perform the functions of both the A/V processor 50 and the picture processor 60.

Storage medium 70 is operative to store digital data including one or more picture files containing pictures that may be cropped using A/V apparatus 100. The pictures contained on storage medium 70 may be encoded in any suitable format such as JPEG or the like. According to an exemplary embodiment, storage medium may be embodied as any type of storage medium such a floppy disk, compact disk, flash memory card, or other storage medium capable of storing picture files. Also according to an exemplary embodiment, storage medium 70 is portable and the picture files stored thereon may be loaded into A/V apparatus 100 directly from a picture acquiring device such as a digital camera or other device.

Figure 4:
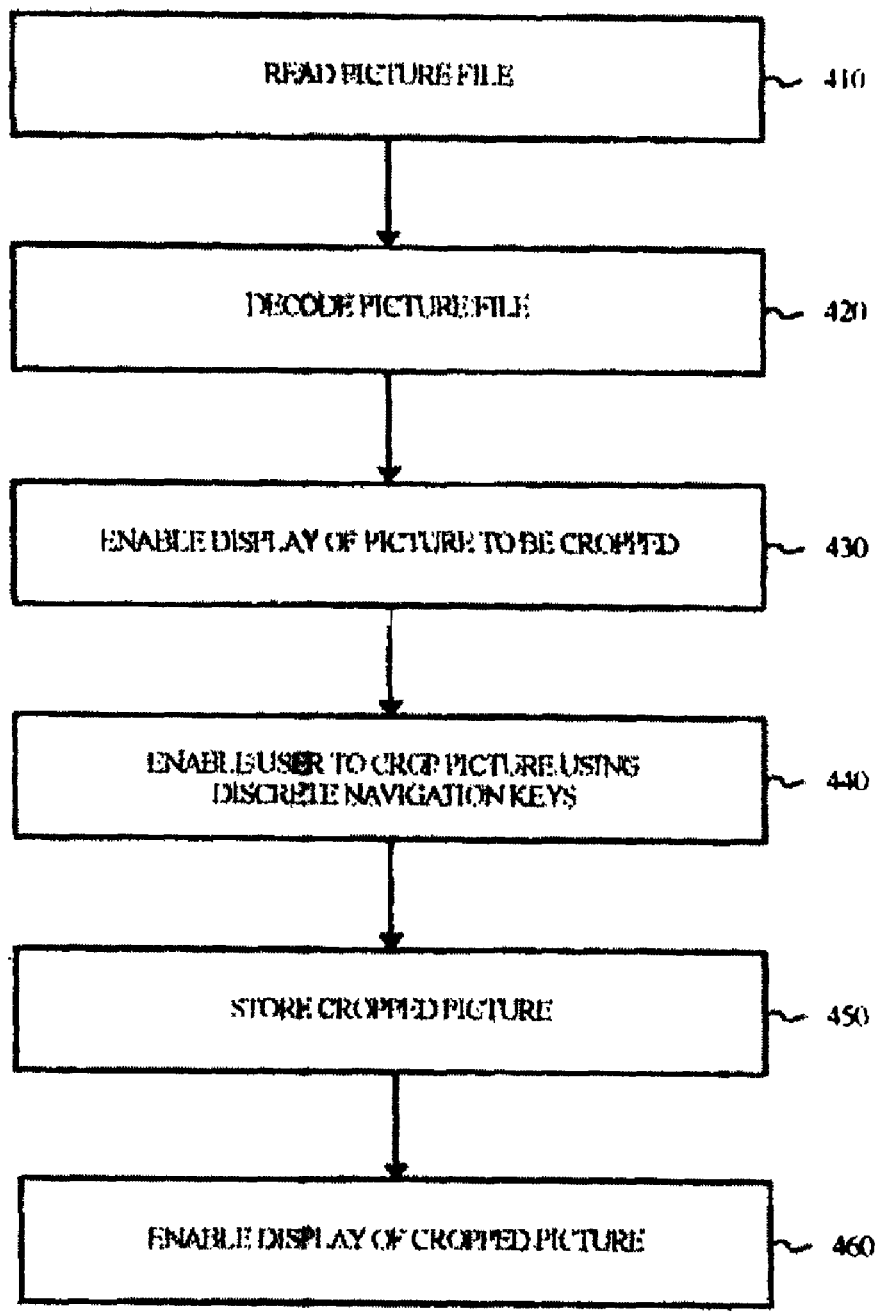
FIG. 4 is a flowchart illustrating steps according to an exemplary embodiment of the present invention.

To facilitate a better understanding of the present invention, an example will now be provided. Referring to FIG. 4, a flowchart 400 illustrating steps according to an exemplary embodiment of the present invention is shown. For purposes of example and explanation, the steps of FIG. 4 will be described with reference to user input device 10 and A/V apparatus 100 described herein. It is noted that the steps of FIG. 4 are performed during the second mode of A/V apparatus 100. The second mode of A/V apparatus 100 may for example be activated responsive to a user input to A/V apparatus 100 via user input device 10, and/or by inserting storage medium 70 into A/V apparatus 100. The steps of FIG. 4 are exemplary only, and are not intended to limit the present invention in any manner.

At step 410, A/V apparatus 100 reads a picture file containing a picture to be cropped. According to an exemplary embodiment, picture processor 60 reads the picture file at step 410 from storage medium 70. The picture file read at step 410 may be encoded in any suitable format such as JPEG or the like. At step 420, A/V apparatus 100 decodes the picture file read at step 410. According to an exemplary embodiment, picture processor 60 decodes the picture file to thereby generate a decoded picture file.

Figure 5:
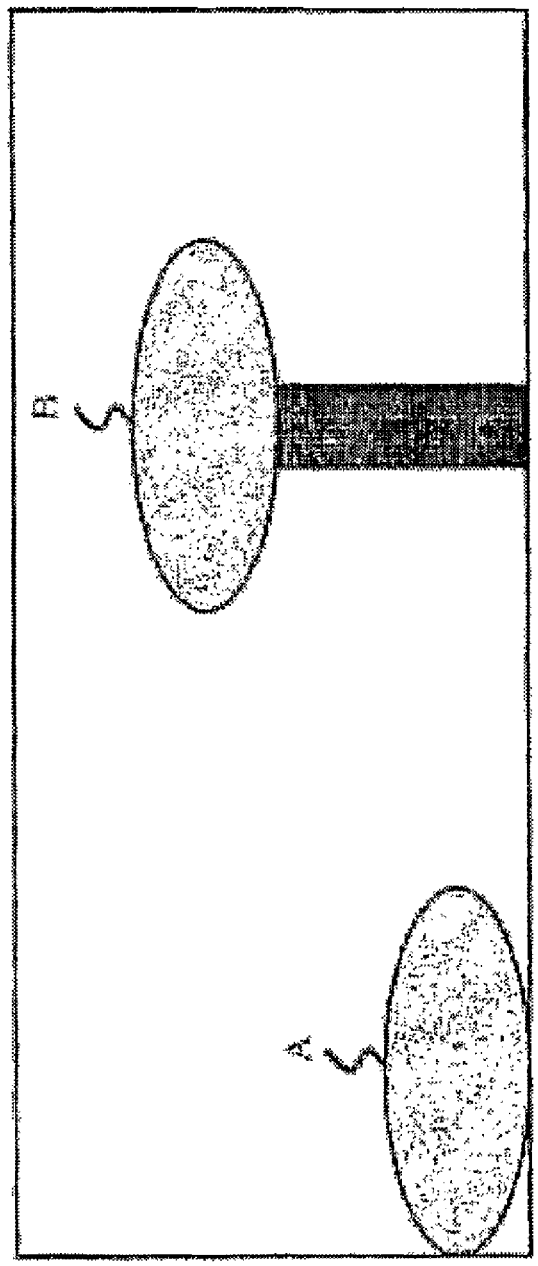
FIGS. 5 to 9 are diagrams illustrating a picture cropping function according to an exemplary embodiment of the present invention.

At step 430, A/V apparatus 100 enables a display of a picture to be cropped. According to an exemplary embodiment, picture processor 60 outputs a signal that enables the display at step 430 responsive to a user input to A/V apparatus 100 via user input device 10 that selects one of the pictures of the decoded picture file. An example of such a picture is represented as diagram 500 of FIG. 5. As indicated in FIG. 5, the picture to be cropped includes two elements, A and B. For purposes of example and explanation, it will be assumed hereinafter that the user wants to crop the picture of FIG. 5 to remove element A.

At step 440, A/V apparatus 100 enables the user to crop the displayed picture using the discrete navigation keys of user input device 10. According to an exemplary embodiment, the previously described left arrow key 11, up arrow key 13, right arrow key 15, and down arrow key 17 of user input device 10 may be used at step 440 to independently adjust each edge of the picture to thereby create a cropped picture having a different aspect ratio than the original picture. Predetermined key 19 of user input device 10 may be used at step 440 to switch edge adjustment capability among the different edges of the picture, and also to confirm selection of desired positions for each edge of the cropped picture.

According to an exemplary embodiment, left arrow key 11, up arrow key 13, right arrow key 15, down arrow key 17 and predetermined key 19 of user input device 10 may be used as follows to adjust each of the four edges of the displayed picture at step 440.

* Left Edge of the Picture

Left Arrow Key 11: Each depression of left arrow key 11 incrementally moves the left edge of the picture to the left until it reaches a left-most limit (e.g., the original left edge of the picture).

Up Arrow Key 13: No action.

Figure 6:
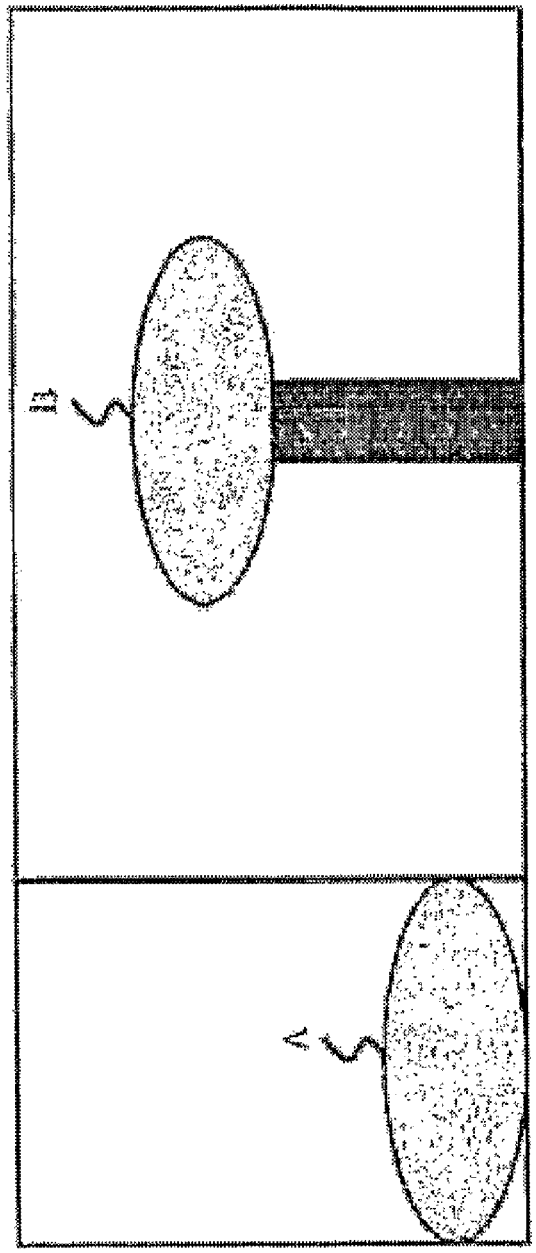

Right Arrow Key 15: Each depression of right arrow key 15 incrementally moves the left edge of the picture to the right until it is a predetermined distance from a right-most limit (e.g., the original right edge of the picture, in which case the picture has only a thin band remaining). Diagram 600 of FIG. 6 shows an example of how the left edge of the picture may be moved to the right via right arrow key 15. As indicated in FIG. 6, the left edge of the picture has been moved right to remove element A.

Down Arrow Key 17: No action.

Predetermined Key 19: A first depression of predetermined key 19 confirms selection of the desired position of the left edge. A second depression of predetermined key 19 switches the edge adjustment capability orthogonally from the left edge to the top edge.

* Top Edge of the Picture

Left Arrow Key 11: No action.

Up Arrow Key 13: Each depression of up arrow key 13 incrementally moves the top edge of the picture upwardly until it reaches an upper-most limit (e.g., the original top edge of the picture).

Right Arrow Key 15: No action.

Down Arrow Key 17: Each depression of down arrow key 17 incrementally moves the top edge of the picture downwardly until it is a predetermined distance from a lower-most limit (e.g., the original bottom edge of the picture, in which case the picture has only a thin band remaining).

Predetermined Key 19: A first depression of predetermined key 19 confirms selection of the desired position of the top edge. A second depression of predetermined key 19 switches the edge adjustment capability orthogonally from the top edge to the right edge.

* Right Edge of the Picture

Left Arrow Key 11: Each depression of left arrow key 11 incrementally moves the right edge of the picture to the left until it is a predetermined distance from the left-most limit (e.g., the original left edge of the picture, in which case the picture has only a thin band remaining).

Up Arrow Key 13: No action.

Right Arrow Key 15: Each depression of right arrow key 15 incrementally moves the right edge of the picture to the right until it reaches the right-most limit (e.g., the original right edge of the picture).

Down Arrow Key 17: No action.

Predetermined Key 19: A first depression of predetermined key 19 confirms selection of the desired position of the right edge. A second depression of predetermined key 19 switches the edge adjustment capability orthogonally from the right edge to the bottom edge.

* Bottom Edge of the Picture

Left Arrow Key 11: No action.

Figure 7:
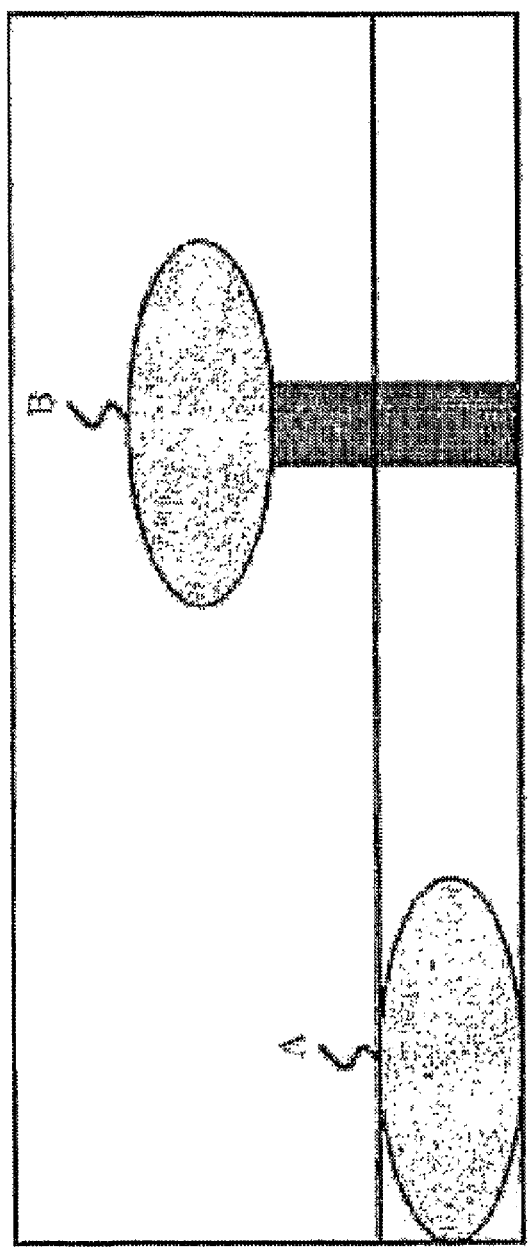

Up Arrow Key 13: Each depression of up arrow key 13 incrementally moves the bottom edge of the picture upwardly until it is a predetermined distance from the upper-most limit (e.g., the original top edge of the picture, in which case the picture has only a thin band remaining). Diagram 700 of FIG. 7 shows an example of how the bottom edge of the picture may be moved upwardly via up arrow key 13. As indicated in FIG. 7, the bottom edge of the picture has been moved upwardly to remove element A.

Right Arrow Key 15: No action.

Down Arrow Key 17: Each depression of down arrow key 17 incrementally moves the bottom edge of the picture downwardly until it reaches the lower-most limit (e.g., the original bottom edge of the picture).

Predetermined Key 19: A first depression of predetermined key 19 confirms selection of the desired position of the bottom edge. A second depression of predetermined key 19 switches the edge adjustment capability orthogonally from the bottom edge to the left edge.

Other sequences may be used as well, for example, left-right-top-bottom and left-right-bottom-top.

Figure 8:
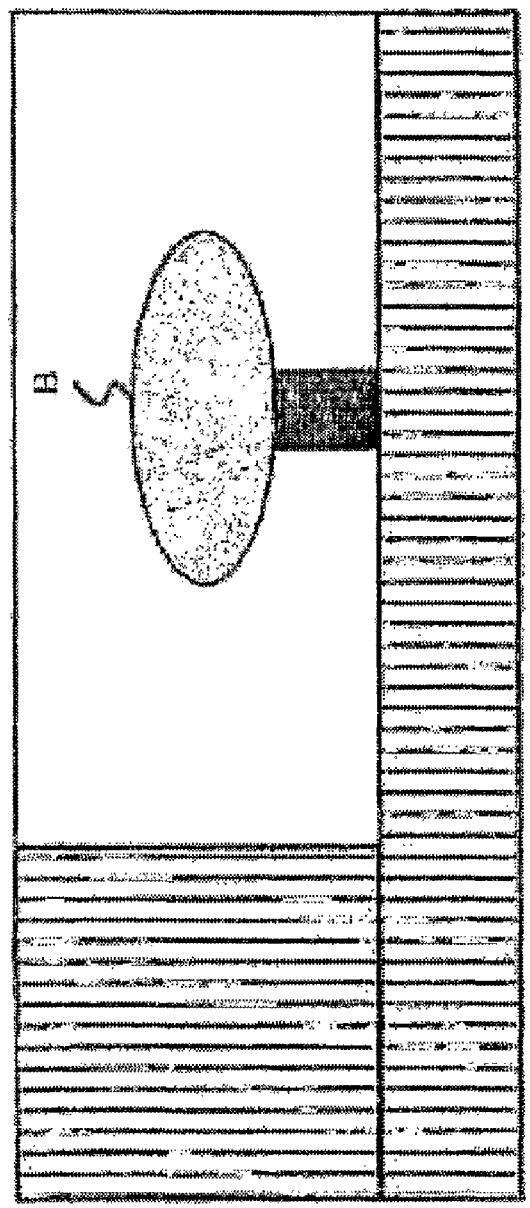

At step 450, A/V apparatus 100 stores the cropped picture generated at step 440. According to an exemplary embodiment, picture processor 60 causes the cropped picture generated at step 440 to be stored on storage medium 70 at step 450. Diagram 800 of FIG. 8 shows an example of the cropped picture generated at step 440. As indicated in FIG. 8, the cropped picture includes only element B, and element A from the original picture has been removed through the picture cropping function. The cropped picture may be stored in different ways at step 450. According to one exemplary embodiment, picture processor 60 may cause storage medium 70 to store data representing only the placement of the new edges at step 450. In this case, the original picture would still exist on storage medium 70, and the new edge placements would be stored as an attribute of the picture. According to another exemplary embodiment, picture processor 60 may cause storage medium 70 to store data representing the entire cropped picture.

Figure 9:
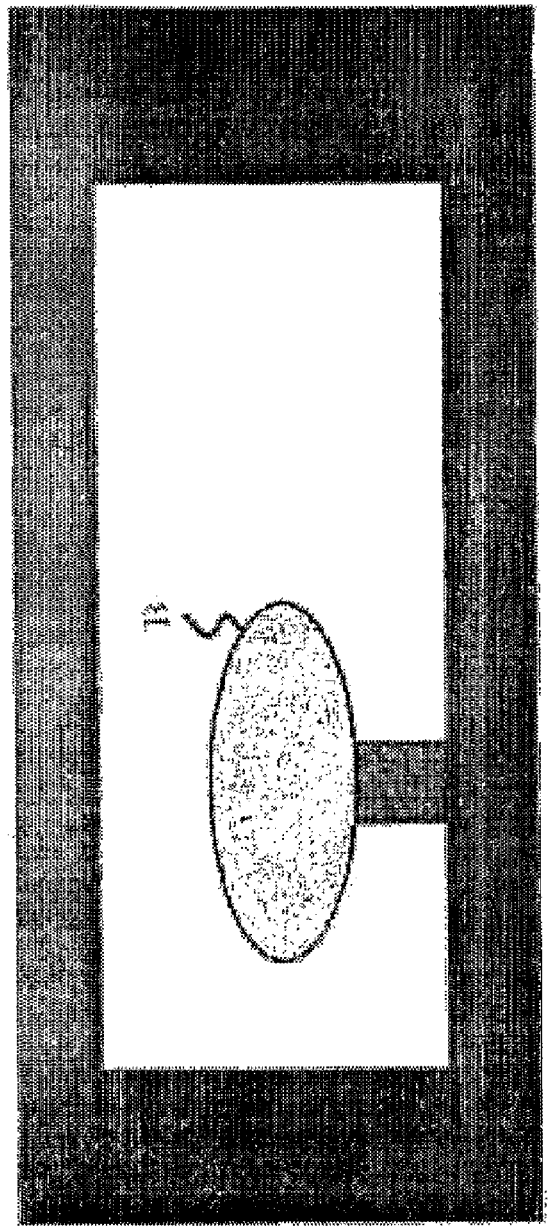

At step 460, A/V apparatus 100 enables a display of the cropped picture generated at step 440 and stored at step 450. Steps 450 and 460 may for example be performed simultaneously, or substantially simultaneously. According to an exemplary embodiment, picture processor 60 outputs a signal that enables the display of the cropped picture at step 460. An example of the cropped picture displayed at step 460 is represented in diagram 900 of FIG. 9. As indicated in FIG. 9, the cropped picture includes only element A, and element B has been removed through the picture cropping function. After the steps of FIG. 4 have been performed, A/V apparatus 100 may for example be switched from the second mode to the first mode responsive to a user input to A/V apparatus 100 via user input device 10.

As described herein, the present invention provides a method and apparatus for providing a picture cropping function that, among other things, enables users to crop pictures in a convenient and direct manner using discrete navigation keys of a user input device. The present invention may be applicable to various apparatuses, either with or without an integrated display device. Accordingly, the phrases "A/V apparatus," "consumer electronics device" or "television signal receiver" as used herein may refer to systems or apparatuses including, but not limited to, television sets, or monitors that include an integrated display device, and systems or apparatuses such as set-top boxes, video cassette recorders (VCRs), digital versatile disk (DVD) players and recorders, video game boxes, personal video recorders (PVRs), or other apparatuses that may not include an integrated display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for operating an apparatus, comprising steps of:
   providing a video signal representing a video image;
   enabling a user to crop said video image using navigation keys of a user input device of said apparatus; and wherein:
   said video image includes first, second, third and fourth edges;
   said user input device includes first, second, third and fourth navigation keys;
   said first, second, third and fourth navigation keys enable said user to adjust said first, second, third and fourth edges, respectively;
   said user input device further includes a predetermined key;
   a first depression of said predetermined key enables said user to confirm selection of a desired position for one of said first, second, third and fourth edges; and
   a second depression of said predetermined key after said first depression enables said user to switch edge adjustment capability from said one of said first, second, third and fourth edges to another one of said first, second, third and fourth edges in an orthogonal manner.

2. The method of claim 1, wherein each edge of said video image is cropped independently to generate a cropped video image having a different aspect ratio than said video image.

3. The method of claim 1, wherein:
   said first edge is orthogonal to said second edge;
   said second edge is orthogonal to said third edge;
   said third edge is orthogonal to said fourth edge; and
   said fourth edge is orthogonal to said first edge.

4. The method of claim 1, wherein said orthogonal manner represents a clockwise direction around said video image.

5. The method of claim 1, wherein said apparatus includes a circuit sharing arrangement in which output signals from a single amplifier of said apparatus are provided to different processors of said apparatus in response to user inputs to said apparatus, and further wherein a first one of said different processors controls a video image cropping function of said apparatus and a second one of said different processors controls at least one function of said apparatus other than said video image cropping function.

6. The method of claim 1, wherein said video image is input to said apparatus directly from a device that acquired said video image.

7. An apparatus, comprising:
   first processing means for providing a video signal representing a video image;
   second processing means for enabling a user to crop said video image using navigation keys of a user input device of said apparatus; and wherein:
   said video image includes first, second, third and fourth edges;
   said user input device includes first, second, third and fourth navigation keys;
   said first, second, third and fourth navigation keys enable said user to adjust said first, second, third and fourth edges, respectively;
   said user input device further includes a predetermined key;
   a first depression of said predetermined key enables said user to confirm selection of a desired position for one of said first, second, third and fourth edges; and
   a second depression of said predetermined key after said first depression enables said user to switch edge adjustment capability from said one of said first, second, third and fourth edges to another one of said first, second, third and fourth edges in an orthogonal manner.

8. The apparatus of claim 7, wherein said second processing means enables said user to adjust each edge of said video image independently to generate a cropped video image having a different aspect ratio than said video image.

9. The apparatus of claim 7, wherein:
   said first edge is orthogonal to said second edge;
   said second edge is orthogonal to said third edge;
   said third edge is orthogonal to said fourth edge; and
   said fourth edge is orthogonal to said first edge.

10. The apparatus of claim 7, wherein said orthogonal manner represents a clockwise direction around said video image.

11. The apparatus of claim 7, further comprising amplifying means for providing signals to said first and second processing means in response to user inputs to said apparatus.

12. The apparatus of claim 7, wherein said video image is input to said apparatus directly from a device that acquired said video image.

13. A television signal receiver, comprising:
   a first processor operative to provide a video signal representing a video image;
   a second processor operative to enable a user to crop said vide image using navigation keys of a user input device of said television signal receiver; and wherein:
   said video image includes first, second, third and fourth edges;
   said user input device includes first, second, third and fourth navigation keys;
   said first, second, third and fourth navigation keys enable said user to adjust said first, second, third and fourth edges, respectively;
   said user input device further includes a predetermined key;
   a first depression of said predetermined key enables said user to confirm selection of a desired position for one of said first, second, third and fourth edges; and a second depression of said predetermined key after said first depression enables said user to switch edge adjustment capability from said one of said first, second, third and fourth edges to another one of said first, second, third and fourth edges in an orthogonal manner.

14. The television signal receiver of claim 13, wherein said second processor enables said user to adjust each edge of said video image independently to generate a cropped video image having a different aspect ratio than said video image.

15. The television signal receiver of claim 13, wherein:
said first edge is orthogonal to said second edge;
said second edge is orthogonal to said third edge;
said third edge is orthogonal to said fourth edge; and
said fourth edge is orthogonal to said first edge.

16. The television signal receiver of claim 13, wherein said orthogonal manner represents a clockwise direction around said video image.

17. The television signal receiver of claim 13, further comprising an amplifier operative to provide signals to said first and second processors in response to user inputs to said television signal receiver.

18. The television signal receiver of claim 13, wherein said video image is input to said television signal receiver directly from a device that acquired said video image.

* * * * *